United States Patent [19]
Stribling, Jr.

[11] Patent Number: 6,050,526
[45] Date of Patent: *Apr. 18, 2000

[54] SOLAR REFLECTOR SYSTEMS AND METHODS

[75] Inventor: Ray A. Stribling, Jr., Redondo Beach, Calif.

[73] Assignee: Hughes Electronics Corporation, El Segundo, Calif.

[*] Notice: This patent is subject to a terminal disclaimer.

[21] Appl. No.: 08/897,853

[22] Filed: Jul. 21, 1997

[51] Int. Cl.⁷ ...................................................... B64G 1/44
[52] U.S. Cl. ........................................... 244/173; 136/245
[58] Field of Search ............................. 244/173, 158 R; 136/245, 246, 292; 126/692

[56] References Cited

U.S. PATENT DOCUMENTS

| | | | |
|---|---|---|---|
| 3,232,795 | 2/1966 | Gillette et al. ........................... | 136/246 |
| 3,600,257 | 8/1971 | Reinhardt ................................. | 428/118 |
| 4,282,394 | 8/1981 | Lackey et al. ........................... | 136/245 |
| 4,394,529 | 7/1983 | Gounder .................................. | 136/245 |
| 4,513,734 | 4/1985 | Butler ..................................... | 126/439 |
| 5,131,955 | 7/1992 | Stern et al. . | |
| 5,487,791 | 1/1996 | Everman et al. . | |
| 5,520,747 | 5/1996 | Marks . | |

FOREIGN PATENT DOCUMENTS

| | | | |
|---|---|---|---|
| 35 0 508 | 9/1986 | Germany . | |
| 54-57886 | 5/1979 | Japan ..................................... | 136/246 |
| 4-146897 | 5/1992 | Japan . | |

OTHER PUBLICATIONS

Sokolsky, Ilene, et al., "Thin Film Solar Concentrator", Naval Research Laboratory, thin film pp. 1–8.

B. R. Spence, et al: "Development of the Astro Edge Solar Array", World conference on Photovoltaic Energy, Waikoloa, Dec. 5–9, 1994, vol. 2, No. Conf. 1, Dec. 5, 1994, pp. 2108–2021, XP000680186, Institute of Electrical and Electronics Engineers.

E. L. Ralph, et al.: "Retractable Planar Space Photovoltaic Array" Record of the Photovoltaic Specialists Conference, Kissimimee, May 21–25, 1990, vol. 2, No. Conf. 21, May 21, 1990, pp. 1369–1373, XP000480387, Institute of Electrical and Elecotronics Engineers, p. 1369, col. 2, Paragraph 2.

J. T. Renshall, G. W. Marks: "The AstroEdge Solar Array for the NASA Small Spacecraft Technology Initiative "Clark-"satellite" Conference Record of the 25$^{th}$ IEEE Photovoltaic Specialist Confernece 1996, May 13–17, 1996, pp. 271–176, XP002095601.

Primary Examiner—Peter M. Poon
Assistant Examiner—Vagnola K. Comer
Attorney, Agent, or Firm—Georgeann S. Grunebach; M. W. Sales

[57] ABSTRACT

A reflector system for a solar wing is provided in which adjacent reflector panels are inhibited from relative movement by coupling tethers. Each reflector panel rotates to be in a stored position adjacent a backface of a respective solar panel. From this stored position, each reflector panel then rotates to be in a deployed position in which it forms a reflection angle with a solar cell face of the respective solar panel. Because of the inhibition of the tethers, the reflector panels deploy together so that one of them does not move past another of them and damage its reflection surface. Upon deployment of a solar wing, a set of spring-biased reflector sheets are automatically urged to cover respective apertures which facilitate installation of restraint structures that maintain the solar wing in its stored configuration.

17 Claims, 4 Drawing Sheets

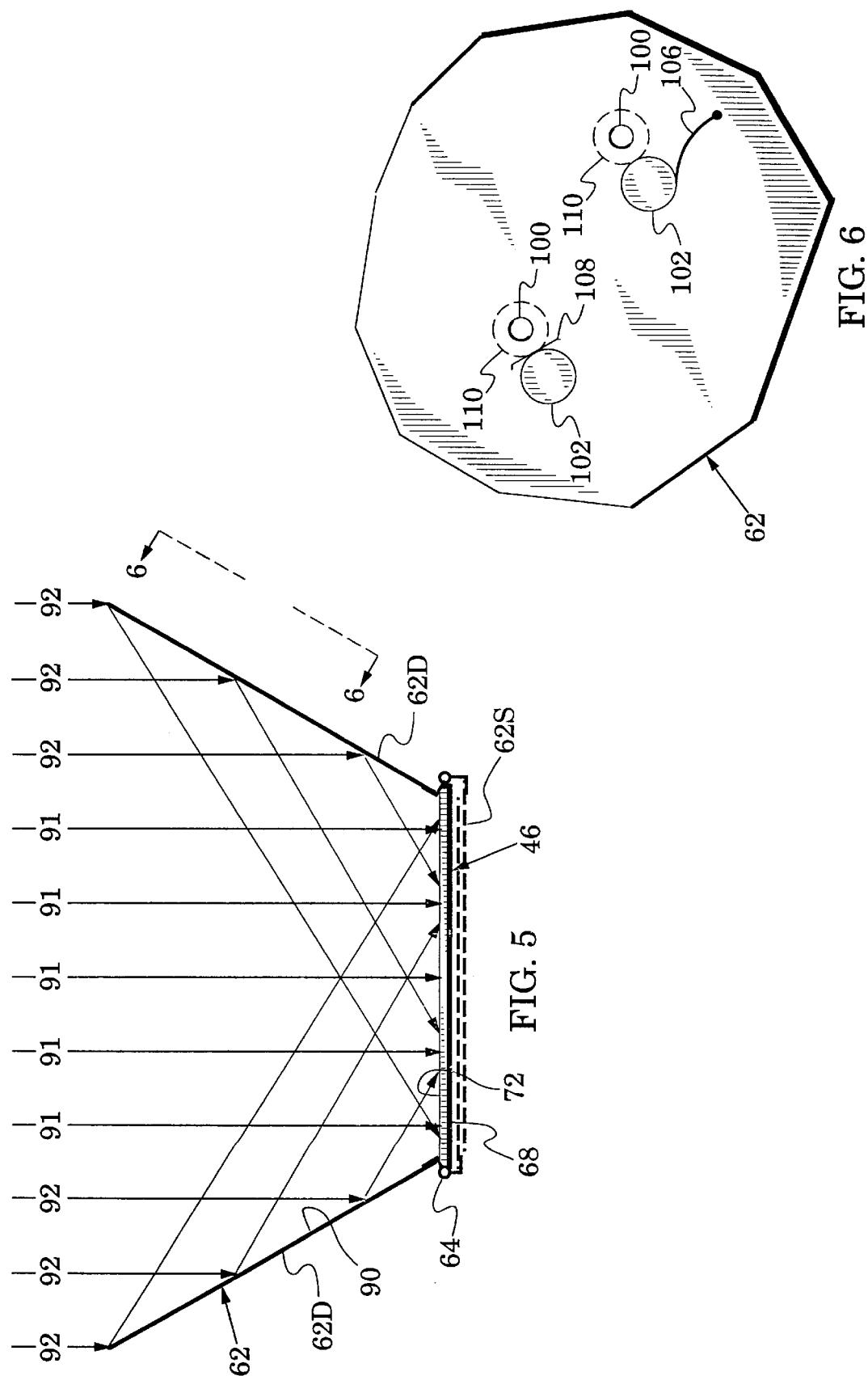

SOLAR REFLECTOR SYSTEMS AND METHODS

BACKGROUND OF THE INVENTION

1. Field of the Invention

The present invention relates generally to spacecraft and, more particularly, to spacecraft solar arrays.

2. Description of the Related Art

Spacecraft typically carry solar cells as a primary energy source with rechargable batteries providing energy storage for eclipse operations. The solar cells are positioned on the spacecraft so that they are exposed to solar radiation.

On spinning spacecraft, solar cells are generally arranged about the outside of a spinning spacecraft body. Accordingly, only a fraction of the cells are exposed to solar radiation at any instant in time. On body-stabilized spacecraft, in contrast, solar cells are typically arranged in planar arrays and carried on solar wings which extend from opposite sides of a spacecraft body. Preferably, the solar wings rotate to keep them as orthogonal to the solar radiation as possible. Because the solar wings can be quite long in their deployed configuration, they generally are formed of a plurality of planar solar panels which are coupled together in an accordion arrangement so that they can be collapsed to a smaller stowed configuration for spacecraft launch.

The number of solar cells that must be carried by a spacecraft is a function of the anticipated spacecraft power demand and the efficiency of the solar cells. Although high-efficiency solar cells reduce the number of cells required by a specific spacecraft, they are quite expensive. Because weight and weight-related costs also increase with the number of solar cells, there is a considerable incentive to reduce the quantity of solar cells that a spacecraft must carry.

Accordingly, efforts have been extended to concentrate solar radiation upon solar cells with reflectors that are positioned to reflect radiation upon the cells. Solar radiation that would otherwise have passed by a solar wing is thus redirected to be incident upon the solar cells. Although energy conversion efficiency of this reflected radiation is typically less than that of direct radiation because of a lesser angle of incidence, the number of spacecraft solar cells can still be significantly reduced with consequent savings in spacecraft weight and cost.

A variety of reflector systems have been proposed. In an exemplary system of U.S. Pat. No. 4,282,394, reflector arms are carried on both inboard and outboard frames. Each of the reflector arms is formed of a plurality of hinged arm sections and each arm section of the inboard frame carries a reflective sheet that is wound on a spring-biased roll. An end of each sheet is attached to a respective arm section on the outboard frame.

During deployment, an extensible shaft moves the outboard frame away from the inboard frame and each reflective sheet is unrolled to reflect solar radiation onto solar cells. Although this reflector system concentrates solar radiation, its complex structure (e.g., hinged arms, inboard and outboard frames and extensible shaft) significantly contributes to spacecraft weight and cost.

In a Naval Research Laboratory design, a single thin-film reflector spans a plurality of solar panels that are coupled together in an accordion arrangement. Each thin-film reflector is carried with tension springs between a pair of rotatable booms. Because the reflector film is held in tension, its edges assume a catenary shape. In order to fold the solar panels into a stowed position, the booms rotate to lie alongside the panels and the thin-film reflector is rolled (e.g., from the reflector center) so that it lies parallel to the booms. Although this reflector system is potentially lighter and simpler than the system described above, it still involves numerous mechanical parts (e.g., booms, cables and pulleys) which have significant weight and degrade reliability.

Other reflector systems are described in U.S. patent application Ser. No. 08/081,909, filed Jun. 18, 1993 and now abandoned (as a continuation of application Ser. No. 07/802,972, filed Dec. 6, 1991 and now abandoned), titled "Augmented Solar Array with Dual Purpose Reflectors" and assigned to Hughes Electronics, the assignee of the present invention. In an exemplary system, a reflector is formed from a reflective material (e.g., an aluminized polyimide film) that is carried by a peripheral frame or affixed over a ribbed structure or a thin metal sheet. Each reflector is coupled to a respective solar panel by a hinge mechanism. Prior to spacecraft launch, the reflector is rotated to lie over the solar cell face of its respective solar panel. After launch, the hinge mechanism rotates the reflector to a position in which it forms a deployment angle with the solar cell face. In an exemplary hinge mechanism, a hinge spring urges the reflector to rotate away from the solar cell face. The hinge mechanism includes a stop member which halts this rotation when the reflector reaches the deployment angle.

In another reflector system embodiment, reflectors are fabricated by suspending a reflective film between a pair of flexible rods that are rigidly coupled to a solar panel. The rods are typically tethered such that the reflectors lie over the solar cell face prior to spacecraft launch. Deployment is effected by untethering which allows the rods to whip directly to a position in which the reflective film forms a deployed angle with the panel.

Other conventional reflector systems have added secondary reflectors at the ends of solar wings so as to redirect nonorthogonal solar radiation onto solar panels.

Although these various reflector systems redirect solar radiation to solar panels, their storage of reflectors over the solar cell face causes the reflectors to block the use of any of the solar panels during any period (e.g., a transfer orbit) in which the panels are in their stowed configuration.

In addition, these reflector systems fail to provide structures that insure that one of the reflectors does not damage and degrade another of the reflectors during reflector deployment.

Typically, restraint members (e.g., explosive bolts) maintain solar panels in their stored configuration prior to deployment. Solar reflectors which fold over respective solar panels must define apertures to permit passage of the restraint members. These conventional reflector systems fail to address the loss of reflection caused by the apertures.

SUMMARY OF THE INVENTION

The present invention is directed to a simple, lightweight and inexpensive solar reflector system which safely deploys without injury to sensitive reflector surfaces and which facilitates installation of restraint members without sacrificing reflector area.

The goal of safe deployment is realized by restraining relative movement between at least one pair of adjacent reflector panels as the pair rotates from a stored position to a deployed position. This relative-movement inhibition reduces the chance of one of the pair damaging the other of the pair. However, an amount of relative movement that is sufficient to accommodate temperature-induced expansion and contraction of the pair is preferably permitted.

In a reflector system embodiment, at least one restraint member is coupled to a pair of adjacent reflector panels to provide an inhibition of relative movement between the pair so that they rotate together from a stored position to a deployed position. Accordingly, relative movement between reflector panels is reduced and, thus, the chance of one of the pair damaging and degrading the reflective surface of the other of the pair is also reduced.

Restraint members which secure solar panels in a stored configuration are accommodated with reflector panel apertures. These apertures may adversely effect a solar panel's power output by casting areas of insufficient illumination onto the panel. Accordingly, a reflector sheet is resiliently coupled to a reflector panel so that the reflector sheet is automatically urged to cover a reflector panel aperture when that reflector panel is in its deployed position and yet the reflector sheet can be moved to clear the aperture when the reflector panel is in its stored position.

Reflector panels of the invention are each stored proximate to a backface of a respective solar panel so that they do not obscure the panel's solar cell face. In a storage process of the invention, a solar cell face is thus exposed for receipt of solar radiation and generation of energy during spacecraft maneuvers (e.g., transfer orbits) when the solar wings are in a stored configuration.

The novel features of the invention are set forth with particularity in the appended claims. The invention will be best understood from the following description when read in conjunction with the accompanying drawings.

BRIEF DESCRIPTION OF THE DRAWINGS

FIG. 5 is a view similar to FIG. 4 which illustrates reflection of solar radiation from the solar reflector system of FIG. 3 onto the solar wing of FIG. 3; and FIG. 6 is an enlarged view along the plane 6—6 of FIG. 5 which illustrates reflector apertures that facilitate the installation of solar panel storage structures and also illustrates reflector sheets that are resiliently urged to cover the reflector apertures when the solar panels are in the coplanar configuration of FIG. 2C.

DETAILED DESCRIPTION OF THE PREFERRED EMBODIMENTS

FIGS. 1–6 illustrate solar reflector systems which include restraint members that reduce the possibility of damaging reflector panels during deployment. These systems further include resiliently coupled reflector sheets which restore the reflection of reflector panels which have been degraded by apertures that accommodate storage members during a storage phase of a solar wing. Reflector systems of the invention also facilitate the exposure of a solar cell face when solar panels are in a storage configuration.

Figure 1:
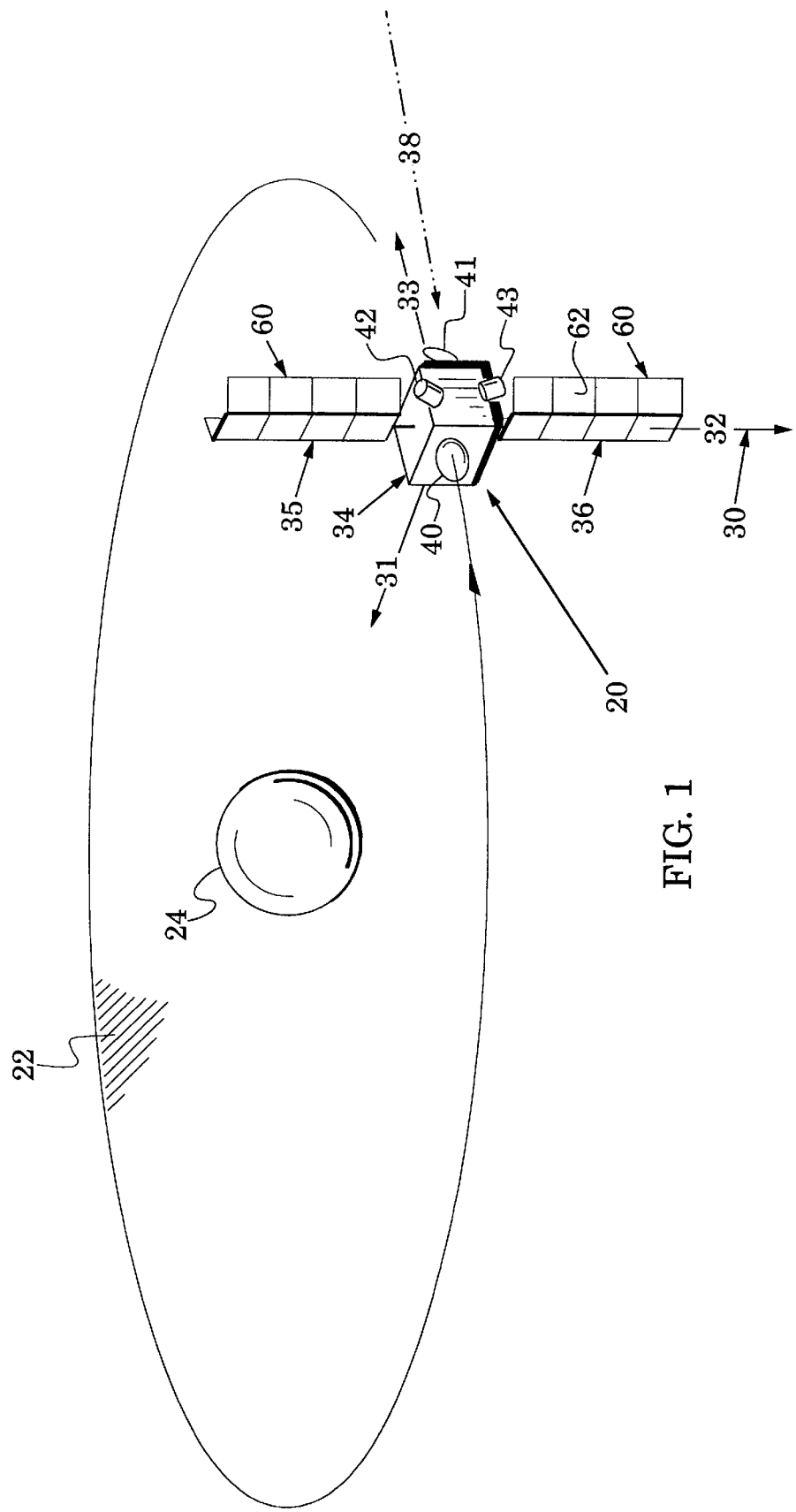
FIG. 1 is a perspective view of a spacecraft in an orbital plane about a celestial body.

In particular, FIG. 1 illustrates a body-stabilized spacecraft 20 which is traveling in an orbital plane 22 about a celestial body such as the Earth 24. The spacecraft's attitude can be described with reference to an orthogonal coordinate system 30 which has an origin at the spacecraft's center of mass. The coordinate system 30 includes a yaw axis 31 which is directed at the Earth 24, a pitch axis 32 which is orthogonal to the orbital plane 22 and a roll axis 33 which is aligned with a velocity vector of the spacecraft 20.

The spacecraft 20 has a body 34 which carries a pair of solar wings 35 and 36 that rotate about the pitch axis 32 so that solar cells of the solar wings are as orthogonal as possible to a Sun line 38 between a Sun (not shown) and the spacecraft 20 (e.g., if the orbital plane 22 is in the Earth's equatorial plane, the solar wings 35 and 36 will be tilted from the Sun line 38 at summer and winter solstice because the Earth travels in an orbital plane which is tilted from the Earth's equatorial plane by ~23.5 degrees). Typically, the spacecraft body 34 also carries antennas 40 and 41 for communication with Earth stations and thrusters 42 and 43 for maintenance of spacecraft stationkeeping and attitude control.

Figure 2A:
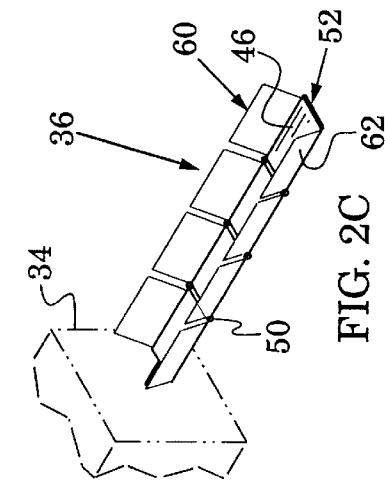
FIGS. 2A–2C are views of a solar wing on the spacecraft of FIG. 1 which illustrate movement of the solar wing between a stowed configuration and a deployed configuration.
Figure 2B:
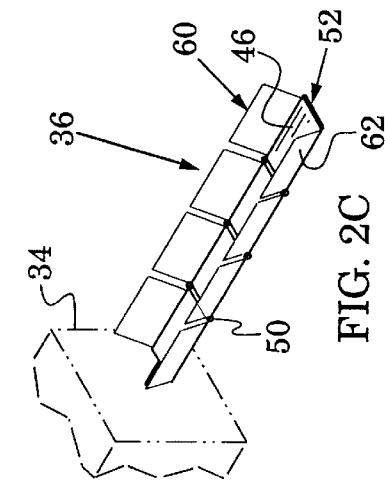
Figure 2C:
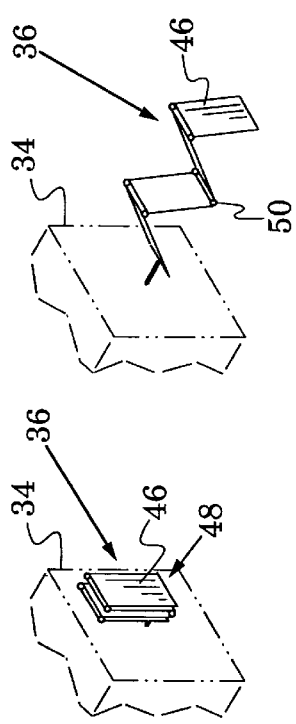

Each of the solar wings 35 and 36 is rotatably coupled to the spacecraft body 34 and is formed of a plurality of rotatably coupled solar panels 46 as shown in FIG. 2A. The solar panels 46 can therefore fold accordion fashion into a stowed configuration 48 adjacent to the spacecraft body 34. In FIG. 2B, the solar panels 46 are shown in a rotation about inter-panel hinges 50 which extends the panels to a coplanar, deployed configuration 52 of FIG. 2C. Although not shown, other deployment structures (e.g., spring-biased cables) are typically associated with the hinges 50 to facilitate movement of the solar panels 46 between their stored and deployed configurations.

FIG. 1 also shows a solar reflector system 60 which includes solar reflectors 62 and which is carried on each of the solar wings 35 and 36. One of the reflector systems 60 is shown in a deployed position in FIG. 2C and in the enlarged views of FIGS. 3 and 4. With reference to these latter figures, a solar wing 35 is coupled to a spacecraft body 34 by a boom 61 and the reflector panels 62 are each rotatably coupled to a respective one of the solar panels 46. Preferably, a pair of reflector panels 62 are coupled to opposite sides of each solar panel 46.

Each reflector panel 62 is coupled with at least one rotating coupling member such as a hinge 64. As shown by an exemplary spring 66 in FIG. 3, resilient members are positioned (e.g., alongside the hinges 64 or contained in the hinges 64) to urge each reflector panel 62 from a stored position 62S (shown in FIG. 4) proximate to a backface 68 of its respective solar panel 46 to a deployed position 62D (shown in FIGS. 3 and 4).

Figure 4:
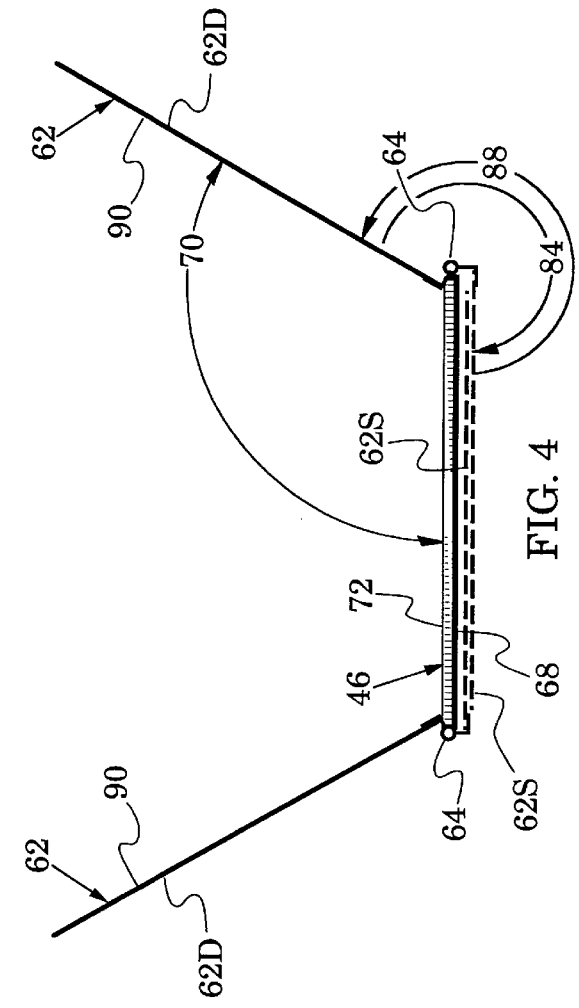
FIG. 4 is an enlarged end view of the solar wing and solar reflector system of FIG. 3.
Figure 3:
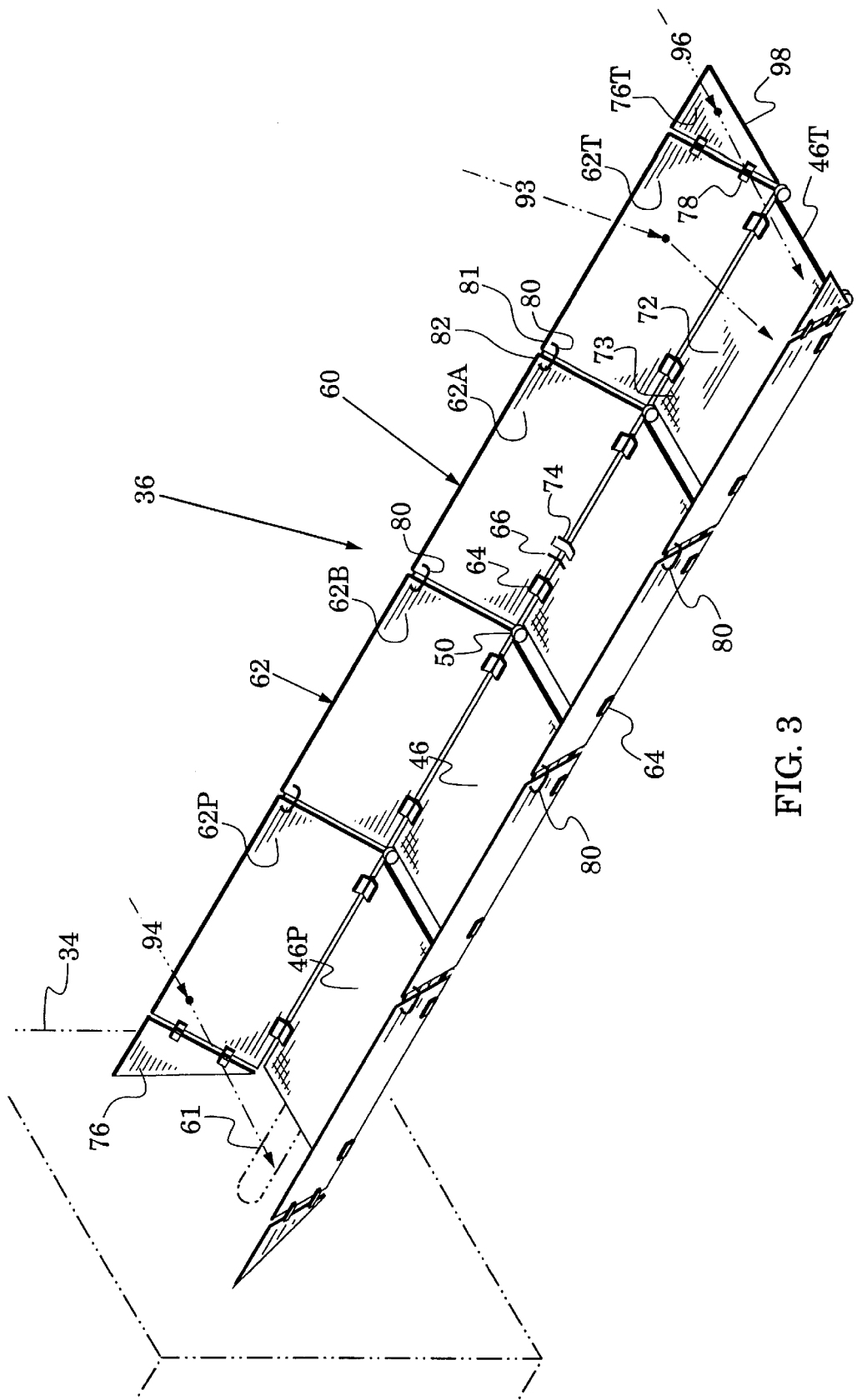
FIG. 3 is an enlarged view of the deployed solar wing of FIG. 2C which illustrates a solar reflector system of the present invention.

FIG. 4 indicates that, in the deployed position, each reflector panel 62 defines an angle 70 (e.g., 120 degrees) with its respective solar panel 46 that is sufficient to cause the reflector panel to reflect solar radiation onto a solar cell face 72 of the respective solar panel 46 (the solar cell face 72 being the panel face which carries solar cells 73 as shown in FIG. 3). As shown by an exemplary stop 74 in FIG. 3, stop members are positioned (e.g., alongside the hinges 64 or contained in the hinges 64) to limit the urging of the spring 66 and position each reflector panel 62 in the deployed position 62D.

As shown in FIG. 3, the reflector system 60 has a proximate reflector panel 62P nearest to the spacecraft body 34 and a terminal solar reflector 62T which is furthest from the spacecraft body. Rotatably coupled to each of the proximate reflector panels 62P and the terminal solar reflectors 62T is a secondary reflector panel 76. These secondary reflector panels are coupled with rotating coupling members that are associated with a spring and a stop similar to the hinges 64. In this case the stop is configured to limit the urging of the spring and position the secondary reflector panels 72 in a coplanar relationship with their respective reflector panels 62.

FIG. 3 also illustrates a restraint member in the form of a tether 80 which couples the upper corners 81 and 82 of the reflector panel 62T and its adjacent reflector panel 62A.

In an exemplary storage of the solar wing 36, the secondary reflector panels 76 are initially rotated on their hinges 64 to be in a parallel relationship with their respective reflector panel 62. The secondary panels 76 can be rotated to lie adjacent to either the solar cell face (72 in FIG. 4) or the backface (68 in FIG. 4) of their respective reflector panel (the spring and stop of the secondary reflector panel hinges 78 can be designed to facilitate either rotation direction).

As indicated by the storage arrow 84 in FIG. 4, the reflector panels 62 are next rotated from the deployed position 62D to the stored position 62S (the hinges 64 are dimensioned to allow one of the reflector panels 62 to lie between the solar panel 46 and the other of the reflector panels 62). Finally, the solar panels 46 are rotated on their inter-panel hinges 50 until they reach the stored configuration 48 of FIG. 2A. The solar wing 36 is maintained in this stored configuration with restraint structures. For example, explosive bolts are installed through the solar wing so as to inhibit outward movement of the terminal solar panel (62T in FIG. 3).

In an exemplary deployment of the solar wing 36, the solar wing restraint structure is removed (e.g., by detonating explosive bolts) and the wing's deployment structure causes (e.g., under urging of a set of spring-biased cables) the wing 36 to move away from its deployed configuration as shown in FIG. 2B. When adjacent solar panels 46 approach the point at which they are in an orthogonal relationship, adjacent sets of solar reflectors 62 are free to begin rotation from the stored position 62S to the deployed position 62D as indicated by the deployment arrow 88 in FIG. 4.

For example, the solar reflectors 62T and 62A that are respectively underneath the outermost solar panel 46T and its adjoining solar panel in FIG. 3 will become free to rotate in accordance with the deployment arrow 88. If not restrained, one of these sets will finally swing past the other and into the deployed position 62D of FIG. 4. The other of these sets will rotate in a similar manner as soon as the other has rotated out of the way.

Unfortunately, this uncontrolled relative movement between reflector panels 62 can damage them during deployment. For example, if the reflector panels 62T are the first to rotate away from the stored position 62S of FIG. 4, they slide past the reflector panels 62A. Accordingly, the reflection surface 90 (shown in FIG. 4) of an exposed one of the reflector panels 62A may be abraded as edges of the reflector panels 62T swing across the reflection surface. Accordingly, this reflection surface will perform in a less-than-optimum fashion when it is in the deployed position 62D of FIG. 4.

This deployment damage is prevented if the tether 80 has been installed. In this case, the tether provides an inhibition of relative movement between reflector panels. Accordingly, the reflector panels do not rotate away from the stored position 62S until they can rotate together. This will occur when the reflector panels 62T and 62A are in a substantially coplanar relationship. This relationship occurs, in turn, when the solar panels 46 are in the coplanar relationship of the deployed configuration 52 of FIG. 2C. Thus, the relative-movement inhibition of the tethers 80 reduces the chance that one of the reflector panels will damage another of the reflector panels during deployment.

The teachings of the invention have been illustrated with a tether 80 that is coupled between reflector panels (e.g., the reflector panels 62T and the reflector panels 62A) that are adjacent to each other when in their stored position (the position 62S of FIG. 4). However, the tether can usefully be coupled between reflector panels that are separated by one of solar panels 46 when in their stored position. For example, tethers 80 can also be coupled between the reflector panel 62A and the adjacent reflector panel 62B in FIG. 3. This coupling will have the effect of inhibiting relative movement between these panels until they are substantially coplanar and this occurs when the solar panels 46 are in the coplanar relationship of the deployed configuration 52 of FIG. 2C. Preferably, the tethers 80 would be installed between all adjacent reflector panels 62.

Redirection of solar radiation is illustrated in FIG. 5 which is a view similar to FIG. 4 with like elements represented by like reference numbers. In a central region of FIG. 5, solar radiation 91 falls directly onto the solar cell face 72 of a solar panel 46. In outer regions of FIG. 5, solar radiation 92 (which would otherwise pass by the solar panel 46) is reflected from the solar reflectors 62 to be incident onto the solar cell face 72.

The efficiency of solar cell conversion of incident solar radiation can be degraded as a function of the angle of incidence and generally falls off with lesser angle of incidence. Accordingly, the radiation 92 that is reflected onto the solar cell face 72 by the solar reflector panel 62 is converted into energy at a lower efficiency than the solar radiation 91 which is directly incident. To an even greater extent, the efficiency is degraded by the heating which results from additional incident radiation. Nonetheless, the output power from the solar cells of the solar panel 46 is significantly enhanced by addition of the redirected radiation 92. Accordingly, the reflector panels 62 facilitate a reduction in the number of solar cells required for a given spacecraft power demand or requirement.

As shown in FIG. 5, the deployed solar panels 62 are particularly suited for redirection, onto the solar panels 46, of orthogonal solar radiation, i.e., solar radiation which has an orthogonal relationship with the solar panels 46. This is evident again in FIG. 3 where an orthogonal solar radiation ray 93 is reflected from the solar reflector 62T to be incident upon the solar panel 46T. Although the spacecraft 20 of FIG. 1 rotates its solar wings 35 and 36 to be as orthogonal as possible to the Sun line 38, if the wings are orthogonal to the orbital plane 22 they will receive nonorthogonal radiation solar radiation during winter and summer solstices.

Some of this nonorthogonal radiation that strikes the reflector panels 62 will not be incident upon a solar panel 46. An exemplary nonorthogonal radiation ray 94 in FIG. 3 is redirected by the reflector panel 62P but misses the solar panel 46P. However, the secondary reflector panels 76 of the invention facilitate recovery of some of the nonorthogonal radiation.

This is illustrated by the exemplary radiation ray 96 which is redirected by the secondary reflector panel 76T so that it is incident upon the solar panel 46T. Had the secondary reflector panel 76T not been present, the radiation ray 94 would have passed beyond the plane of the reflector panel 62T and its radiation energy lost as far as the solar wing 36 is concerned. Nonorthogonal radiation having an opposite angle from orthogonality will be similarly redirected by secondary reflector panels 76 at the opposite end of the solar wing 36.

Preferably, the secondary reflector panels 76 have a triangular shape to augment the rectangular reflector shape of the reflector panels 62. The outer side 98 of each secondary reflector panel 76 can be canted outward by the expected angle (e.g., ~23.5 degrees) of the nonorthogonal radiation.

As mentioned above, the solar wing 36 of FIG. 2A is maintained in its stored configuration 48 with restraint structures such as explosive bolts which are installed through the solar wing so as to inhibit outward movement of the terminal solar panel (62T in FIG. 3) prior to deployment. The solar wing 36 deploys to the deployed configuration 52 of FIG. 2C after the restraint members are removed. For example, after the spacecraft 20 of FIG. 1 reaches its orbital plane 22, explosive bolts would be blown so as to permit the solar panels 46 to rotate on the inter-panel hinges 50 to the deployed configuration of FIG. 2. To facilitate passage of the restraint members, the stored reflector panels (62 in FIG. 2C) are configured to form apertures 100 as shown in FIG. 6.

Conventionally, these apertures 100 degrade the reflection surface (90 in FIG. 4) of the reflector panels with consequent reduction in solar radiation which is incident upon the solar cells (73 in FIG. 3). In accordance with the present invention, the reflection surface 90 is substantially restored with reflector sheets 102 which automatically cover the apertures 100 when the reflector panels 62 are in their deployed position. As illustrated in FIG. 6, the reflector sheets 102 are resiliently coupled to their respective reflector panel 62. This resilient coupling is formed with spring members such as the leaf spring 106 and the resilient flap 108 (e.g., formed of a resilient plastic).

When the solar wing 36 is in its storage configuration 48 of FIG. 2A, the reflector sheets 102 are moved against the urging of their spring members to clear respective apertures 100. This permits the apertures 100 to receive restraint structures that maintain the solar wing in its stored configuration. When the restraint members are removed (e.g., by blowing an explosive bolt), the reflector sheets 102 are automatically urged to positions 110 in which they cover their respective apertures 100 so that the reflection surface (90 in FIG. 4) is substantially restored.

The structures of the invention can be realized with a variety of materials. In an exemplary realization, the solar reflectors 62 (and secondary reflectors 76) are formed of a a honey-comb core (e.g., of aluminum) with at least one reflective face formed of graphite fiber and expoxy composite. A reflective film or surface (e.g., polyimide) can be bonded over the composite. In another exemplary realization, the solar reflectors 62 are formed of metallic sheets (e.g., of aluminum).

In an exemplary realization of the tethers 80 of FIG. 3, they are formed of flexible cord. Preferably the tethers are configured to permit an amount of relative movement between reflector panels that is sufficient to accommodate temperature-induced expansion and contraction of the panels.

Although the teachings of the invention have been illustrated with reference to pairs of reflector panels (e.g., pairs of terminal panels 62T that are carried at opposite edges of the terminal solar panel 46T of FIG. 3), these teachings can be practiced with at least one reflector panel 62 that is rotatably coupled to each of a set of solar panels.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A solar reflector system for concentrating solar radiation upon a plurality of solar panels which each has a solar cell face and a back face, said solar panels rotatably coupled together to move in an accordion motion between a stored configuration in which said solar panels are in a substantially parallel relationship and a deployed configuration in which said solar panels are in a substantially coplanar relationship, said solar reflector system comprising:

a plurality of reflector panels, each rotatably coupled to a respective one of said solar panels to rotate between a stored position proximate to the backface of said respective solar panel and a deployed position in which the reflector panel defines an angle with said respective solar panel sufficient to cause the reflector panel to reflect solar radiation onto the solar cell face of said respective solar panel; and at least one restraint member coupled to a pair of adjacent reflector panels to provide an inhibition of relative movement between said pair so that said pair rotates together from said stored position to said deployed position, said relative-movement inhibition reducing the chance of one of said pair damaging the other of said pair.

2. The solar reflector system of claim 1, wherein said restraint member is a flexible tether.

3. The solar reflector system of claim 2, wherein said tether is a cord.

4. The solar reflector system of claim 1, wherein the reflector panels of said pair are adjacent to each other when in their stored position.

5. The solar reflector system of claim 1, wherein the reflector panels of said pair are separated by one of said solar panels when in their stored position.

6. The solar reflector system of claim 1, wherein said restraint member is configured to permit an amount of relative movement between said pair that is sufficient to accommodate temperature-induced expansion and contraction of said pair.

7. The solar reflector system of claim 1, wherein each of said reflector panels includes:

a honey-comb core having first and second faces; and a reflective sheet carried over at least one of said faces.

8. The solar reflector system of claim 7, wherein said reflective sheet is a graphite fiber and epoxy composite.

9. The solar reflector system of claim 1, wherein each of said reflector panels comprises a metallic sheet.

10. The solar reflector system of claim 1, wherein at least a selected one of said reflector panels defines an aperture to facilitate restraint of said solar panels when they are in their stored configuration and further including at least one reflector sheet which is resiliently coupled to said selected reflector panel so that said reflector sheet is automatically urged to cover said aperture when said selected reflector panel is in its deployed position and can be moved to clear said aperture when said selected reflector panel is in its stored position.

11. A solar reflector system for concentrating solar radiation upon a plurality of solar panels which each has a solar cell face and a back face, said solar panels rotatably coupled together to move in an accordion motion between a stored configuration in which said solar panels are in a substantially parallel relationship and a deployed configuration in which said solar panels are in a substantially coplanar relationship, said solar reflector system comprising:

a plurality of reflector panels, each rotatably coupled to a respective one of said solar panels to rotate between a stored position proximate to the backface of said respective solar panel and a deployed position in which the reflector panel defines an angle with said respective solar panel sufficient to cause the reflector panel to reflect solar radiation onto the solar cell face of said respective solar panel, at least a selected one of said reflector panels forming an aperture to facilitate restraint of said solar panels when they are in their stored configuration; and a reflector sheet which is resiliently coupled to said selected reflector panel so that said reflector sheet is automatically urged to cover said aperture when said selected reflector panel is in its deployed position and can moved to clear said aperture when said selected reflector panel is in its stored position.

12. The solar reflector system of claim 11, further including at least one restraint member coupled to a pair of adjacent reflector panels to provide an inhibition of relative movement between said pair so that said pair rotates together from said stored position to said deployed position, said relative-movement inhibition reducing the chance of one of said pair damaging the other of said pair.

13. A spacecraft system, comprising:

a spacecraft;

a plurality of solar panels which each has a solar cell face and a back face, said solar panels rotatably coupled to said spacecraft and also rotatably coupled together to move in an accordion motion between a stored configuration in which said solar panels are in a substantially parallel relationship and proximate to said spacecraft and a deployed configuration in which said solar panels are in a substantially coplanar relationship and extend away from said spacecraft;

a plurality of reflector panels, each rotatably coupled to a respective one of said solar panels to rotate between a stored position proximate to the backface of said respective solar panel and a deployed position in which the reflector panel defines an angle with said respective solar panel sufficient to cause the reflector panel to reflect solar radiation onto the solar cell face of said respective solar panel; and at least one restraint member coupled to a pair of adjacent reflector panels to provide an inhibition of relative movement between said pair so that said pair rotates together from said stored position to said deployed position, said relative-movement inhibition reducing the chance of one of said pair damaging the other of said pair.

14. The spacecraft system of claim 13, wherein a selected one of said reflector panels defines an aperture to facilitate restraint of said solar panels when they are in their stored configuration and further including at least one reflector sheet which is resiliently coupled to said selected reflector panel so that said reflector sheet is urged to block said aperture when said selected reflector panel is in its deployed position and can moved to clear said aperture when said selected reflector panel is in its stored position.

15. A method for reducing damage to a plurality of solar reflectors as they and a plurality of solar panels are deployed from a spacecraft body, comprising the steps of:

deploying said solar panels in an accordion motion from a stored configuration in which said solar panels are in a substantially parallel relationship to a deployed configuration in which said solar panels are in a substantially coplanar relationship;

from each of said solar panels, rotating at least one reflector panel from a stored position proximate to a backface of the solar panel to a deployed position in which the reflector panel defines an angle with the solar panel sufficient to cause the reflector panel to reflect solar radiation onto a solar cell face of the solar panel; and restraining relative movement between at least one pair of adjacent reflector panels as said pair rotates from said stored position to said deployed position, said relative-movement inhibition reducing the chance of one of said pair damaging the other of said pair.

16. The method of claim 15, wherein said restraining step includes the step of permitting an amount of relative movement between said pair that is sufficient to accommodate temperature-induced expansion and contraction of said pair.

17. A method for storing a solar wing and a solar reflector system on a spacecraft so that said solar wing generates electrical energy in a stored configuration, comprising the steps of:

providing a solar wing which is rotatably coupled to said spacecraft and which has a plurality of rotatably coupled solar panels which deploy to a coplanar configuration in which a terminal solar panel is furthest from said spacecraft;

rotatably coupling solar reflector panels of said solar reflector system to said solar panels;

rotating said reflector panels away from solar cell faces of said solar panels to a storage position behind said solar panels; and folding said solar panels in an accordion-style movement to a storage configuration in which said solar panels are in a substantially parallel relationship and a solar cell face of said terminal solar panel faces away from said spacecraft so that it is exposed to solar radiation.

* * * * *